A. TOMASZAK.
BOILER.
APPLICATION FILED JULY 20, 1917.

1,351,142.

Patented Aug. 31, 1920.

INVENTOR
Antoni Tomaszak.
BY Oscar Geier
HIS ATTORNEY

UNITED STATES PATENT OFFICE.

ANTONI TOMASZAK, OF COHOES, NEW YORK, ASSIGNOR OF ONE-THIRD TO JOZEF WAZ, OF COHOES, NEW YORK.

BOILER.

1,351,142.    Specification of Letters Patent.    Patented Aug. 31, 1920.

Application filed July 20, 1917. Serial No. 181,686.

*To all whom it may concern:*

Be it known that I, ANTONI TOMASZAK, a subject of the King of Poland, resident of Cohoes, county of Albany, and State of New York, have invented certain new and useful Improvements in Boilers, of which the following is a specification.

This invention relates to improvements in boilers such as are used for culinary and other purposes and has as its special object the provision of means whereby steam is deflected as it arises and is returned to the boiler as are all other vapors in their condensed state.

It is the principal object of the invention to provide a boiler offering a comparatively large condensing surface to the steam and providing means to collect the products of condensation during the boiling process and allowing a return of the same into the boiler upon the cessation of the boiling process. Thus heat and liquids will be saved which is especially valuable if for instance milk or rice are boiled within the boiler.

These and other like objects are attained by the novel construction and combination of parts hereinafter described and shown in the accompanying drawing, forming a material part of this disclosure and in which:—

Figure 2:
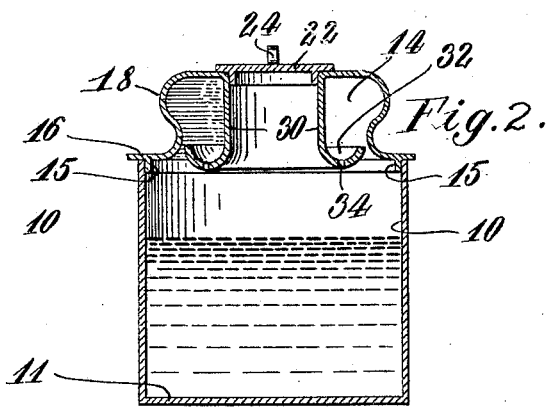
Figure 1:
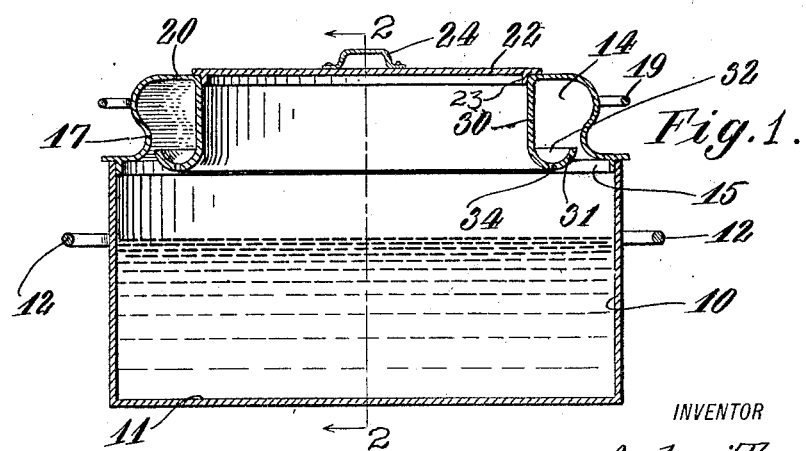

Figure 1 is a vertical sectional view taken through the center of a boiler constructed according to the present invention, and Fig. 2 is a sectional view, the section being taken on line 2—2 of Fig. 1.

The boiler 10, which may be of elliptical or circular cross-section, as preferred, is provided with a rigid bottom 11 and a pair of handles 12 by means of which it may be manipulated.

A cover 14 of peculiar design is formed with an encircling flange 15, adapted to make close contact with the interior walls of the boiler 10, the material of the cover being formed inwardly as at 16, to a reëntrantly turned, curved portion 17, ending in a circumferential beading 18, to which are attached a pair of handles 19, the cover terminating in a flat plate 20. The plate 20 is formed with a central opening in which engages a supplementary cover 22 with its inner flange 23 and having a single central operating handle 24.

The material of the cover plate 20 extends downwardly at right angles forming a vertical wall 30, its lower edge 31 being curved upward to form a trough shaped structure 32 in the bottom part of which are provided minute perforations 34 permitting the liquid of condensation to collect within the trough 32 during the boiling operation and upon the cessation of this operation to slowly trickle through the holes 34 back into the boiler 10. The escape of vapor or steam emanating from the liquid as for instance milk contained within the boiler will thus be avoided and the boiler will work extremely economically as no part of the milk will be lost.

Having thus described my invention what I claim and desire to secure by Letters Patent of the United States is as follows:—

In a boiler, the combination of a metallic vessel, with a cover fitted thereto, said cover being provided with a flange fitting against the interior wall of said vessel, a central interior tube formed with said cover extending downward therein, an outwardly flaring trough on the lower extremity of said tube having minute perforations and a supplementary flanged cover closing the upper end of said tube.

In testimony whereof I have affixed my signature.

ANTONI TOMASZAK.